Aug. 7, 1951     S. A. DOMACK     2,563,319
CONTAINER HANDLING MACHINE
Filed July 29, 1947     5 Sheets-Sheet 1

INVENTOR.
Stanley A. Domack
BY
Sheridan, Davis and Cargill
Attys

Aug. 7, 1951 S. A. DOMACK 2,563,319
CONTAINER HANDLING MACHINE
Filed July 29, 1947 5 Sheets-Sheet 4
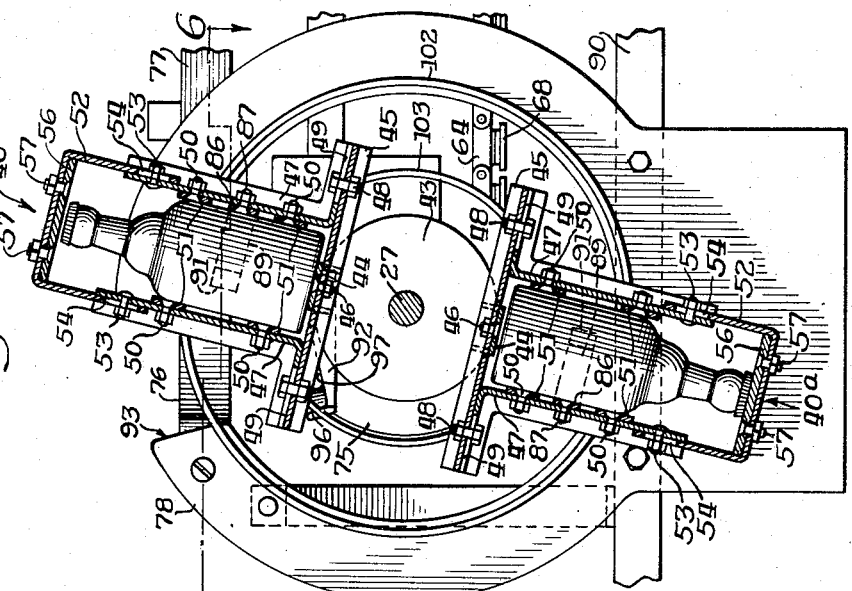
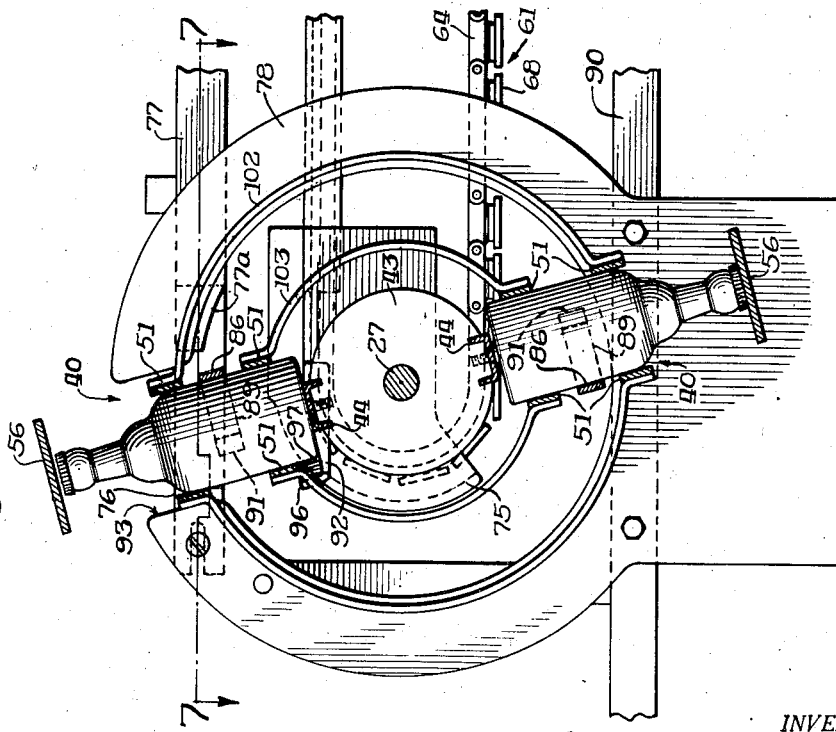
INVENTOR.
Stanley A. Domack
BY Sheridan, Davis & Cargill
Attys

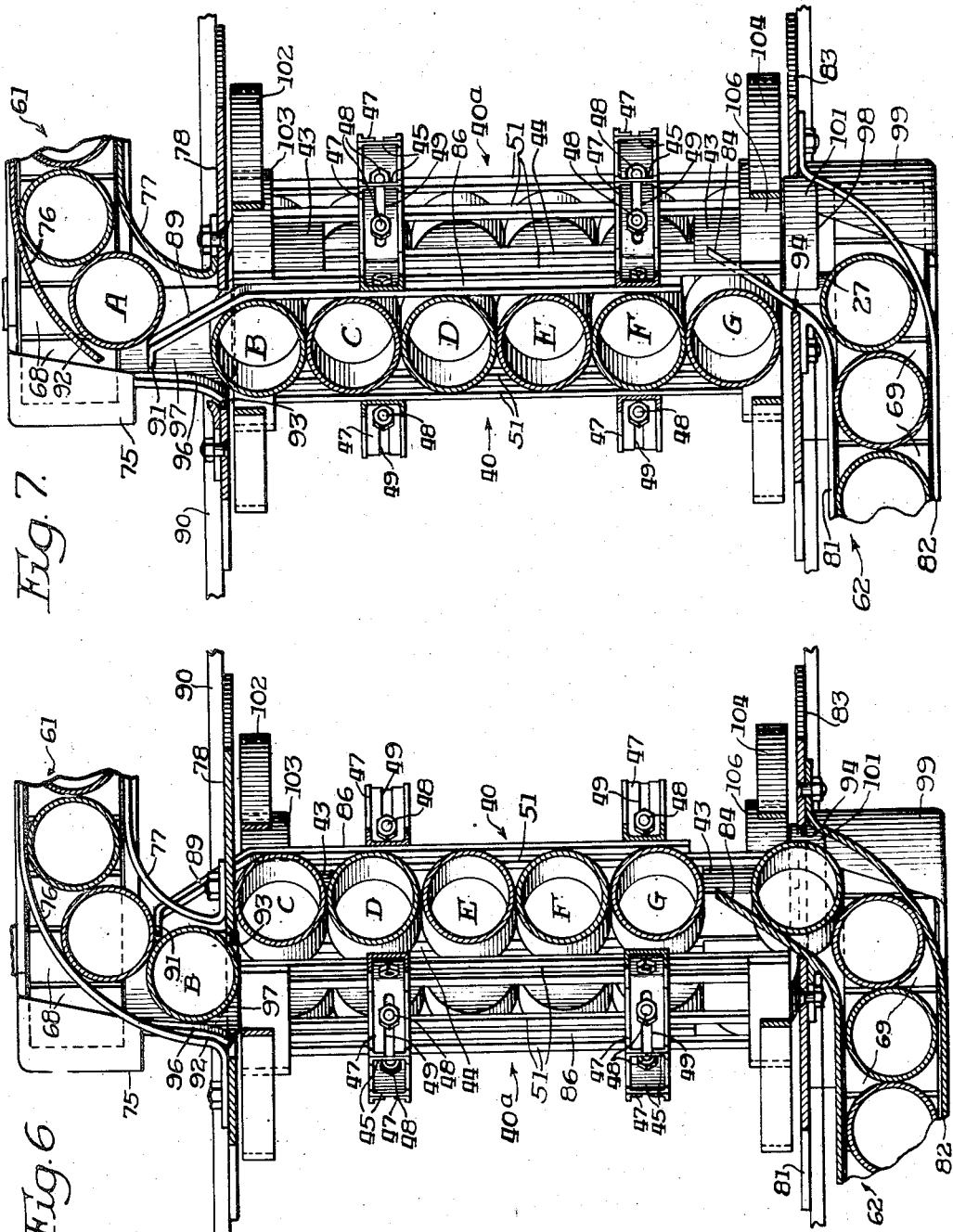

Patented Aug. 7, 1951

2,563,319

UNITED STATES PATENT OFFICE 2,563,319

CONTAINER HANDLING MACHINE

Stanley A. Domack, Oshkosh, Wis., assignor to Keenline Equipment Corporation, Oshkosh, Wis., a corporation of Wisconsin Application July 29, 1947, Serial No. 764,432

7 Claims. (Cl. 259—54)

This invention relates to machines for the handling of containers such as bottles, cans, jars and the like and an object of the invention is to provide a machine for mixing the ingredients of soft drinks and the like in such containers.

In the manufacture of bottled soft drinks, for example, the product is compounded in the bottle by introducing syrup and carbonated water in predetermined proportions into each bottle, capping it, and thereafter agitating it to bring about the mixing of the two ingredients.

The present invention is directed to a machine which may be associated with a conveyor leading from the filling and capping stages and which will automatically turn the bottles end over end a predetermined number of times and at a predetermined rate necessary for complete mixing of the contents and then discharge the mixed bottled product for packing and shipment.

It is a further object to provide such a machine which is far simpler, more foolproof, more compact and cheaper to construct than machines conventionally provided for this purpose.

Other objects and advantages will become readily apparent from the following description taken in connection with the drawings in which:

Fig. 4 is a sectional view of the machine taken in the direction of the line 4—4 of Fig. 1 and showing the inclination of the carriers at the moment a container is diverted onto the inlet of the top carrier; for clarity, this view should be considered with Fig. 7;

Fig. 5 is a sectional view of the machine taken in the direction of the line 5—5 of Fig. 1, and showing the inclination of the carriers in the discharge position, that is at the moment that a container is being diverted from the outlet end of the top carrier; for clarity, this view should be considered with Fig. 6;

Fig. 6 is a sectional view of Fig. 5 taken along the line 6—6;

Fig. 7 is a view similar to Fig. 6 but taken along the line 7—7 of Fig. 4;

Fig. 8 is a partial sectional view of Fig. 1 taken along the line 8—8 and showing one end of the input conveyor; and Fig. 9 is a view similar to Fig. 8 but taken along the line 9—9 of Fig. 1 and showing one end portion of the output conveyor.

Referring now more specifically to the drawings, the embodiment shown employs a supporting framework comprising a pair of inverted U-shaped angle members 21 and 22 mounted on the floor or other supporting surface 23 and having a pair of channel members 24 and 26 connected across them, as by welding.

Figure 1:
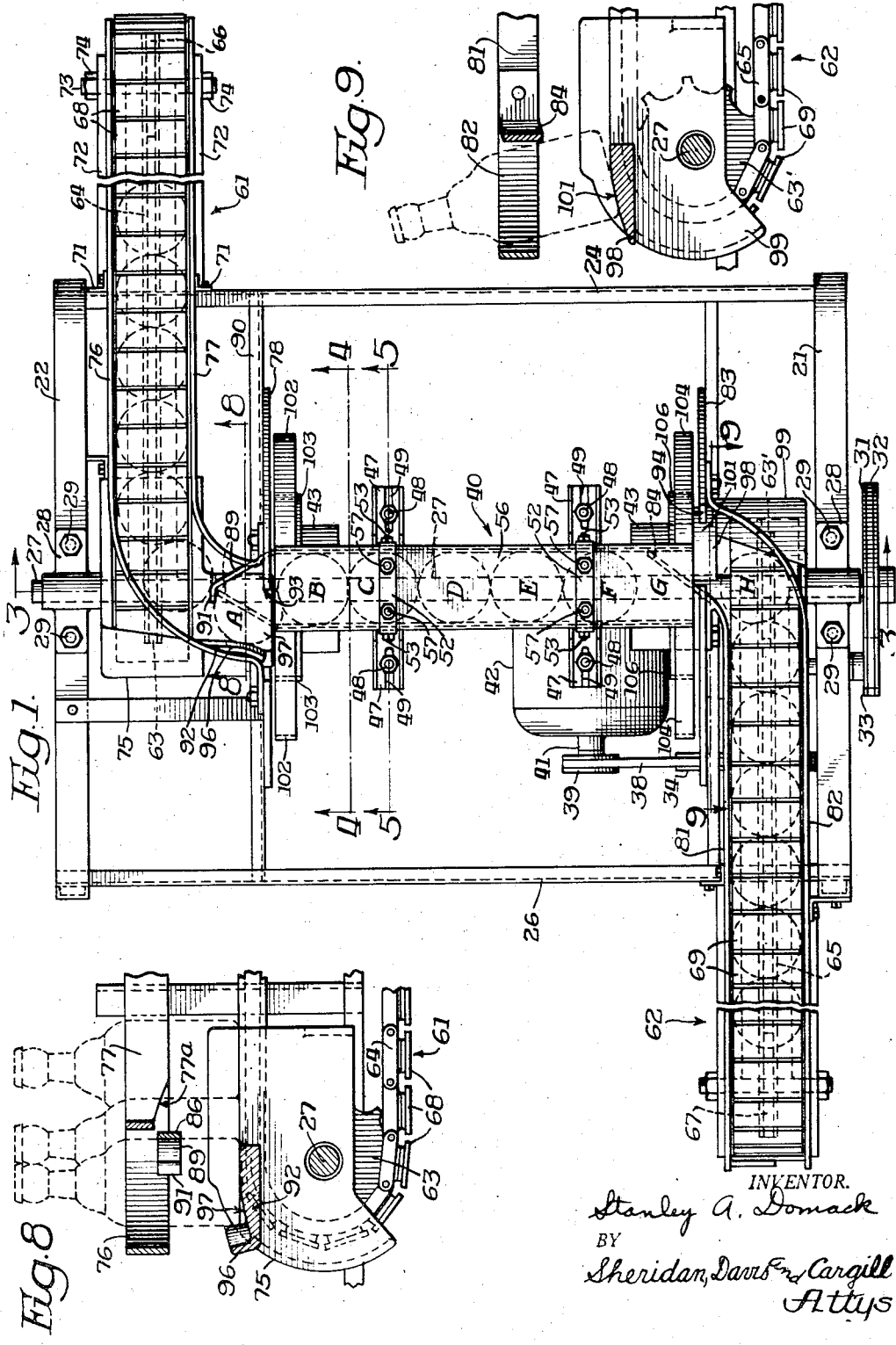
Figure 1 is a top plan view of a container handling machine illustrating one embodiment of the mixing machine together with forms of inlet and outlet conveyor means which may be employed with it.
Figure 2:
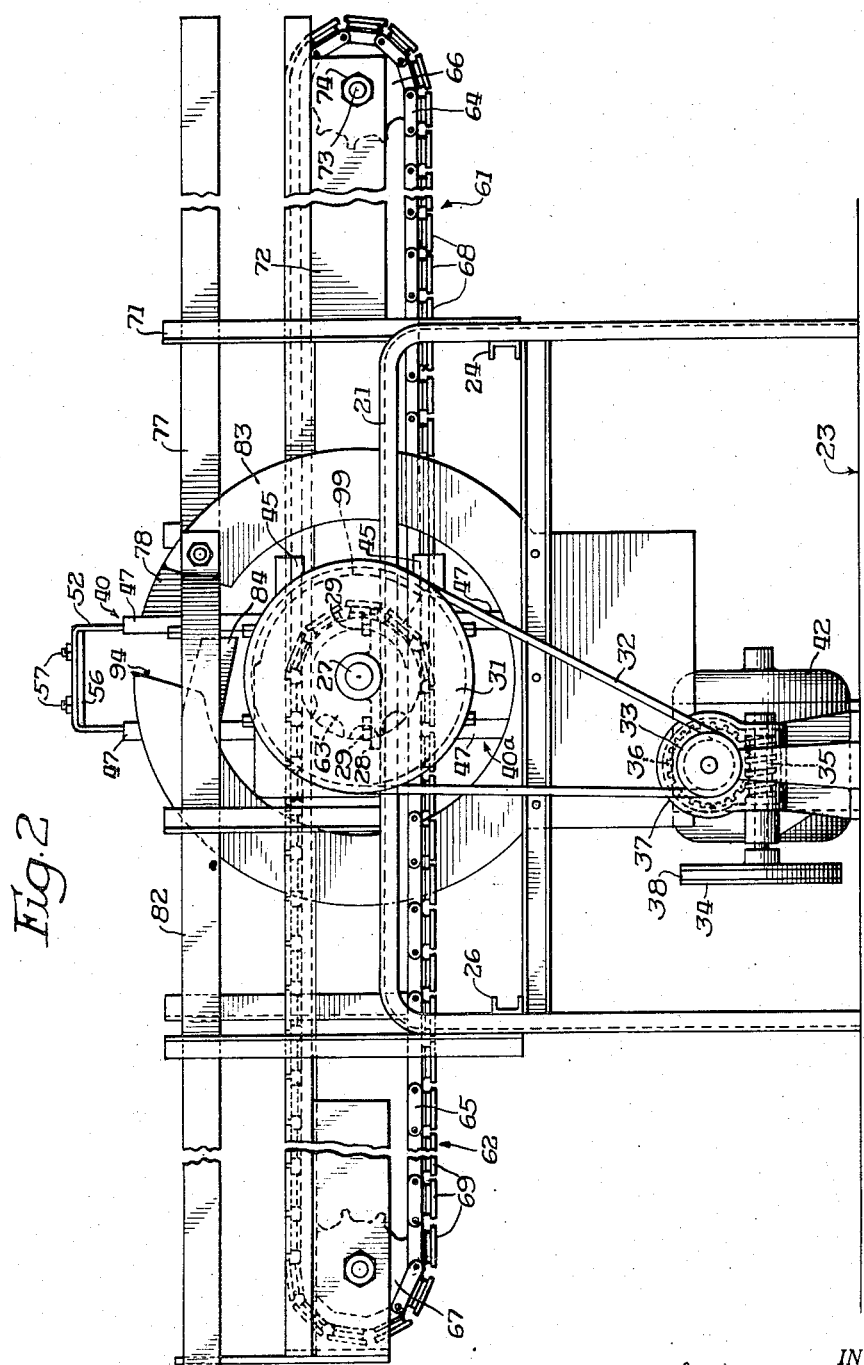
Fig. 2 is an outside elevational view of Fig. 1, showing the discharge side of the machine.
Figure 3:
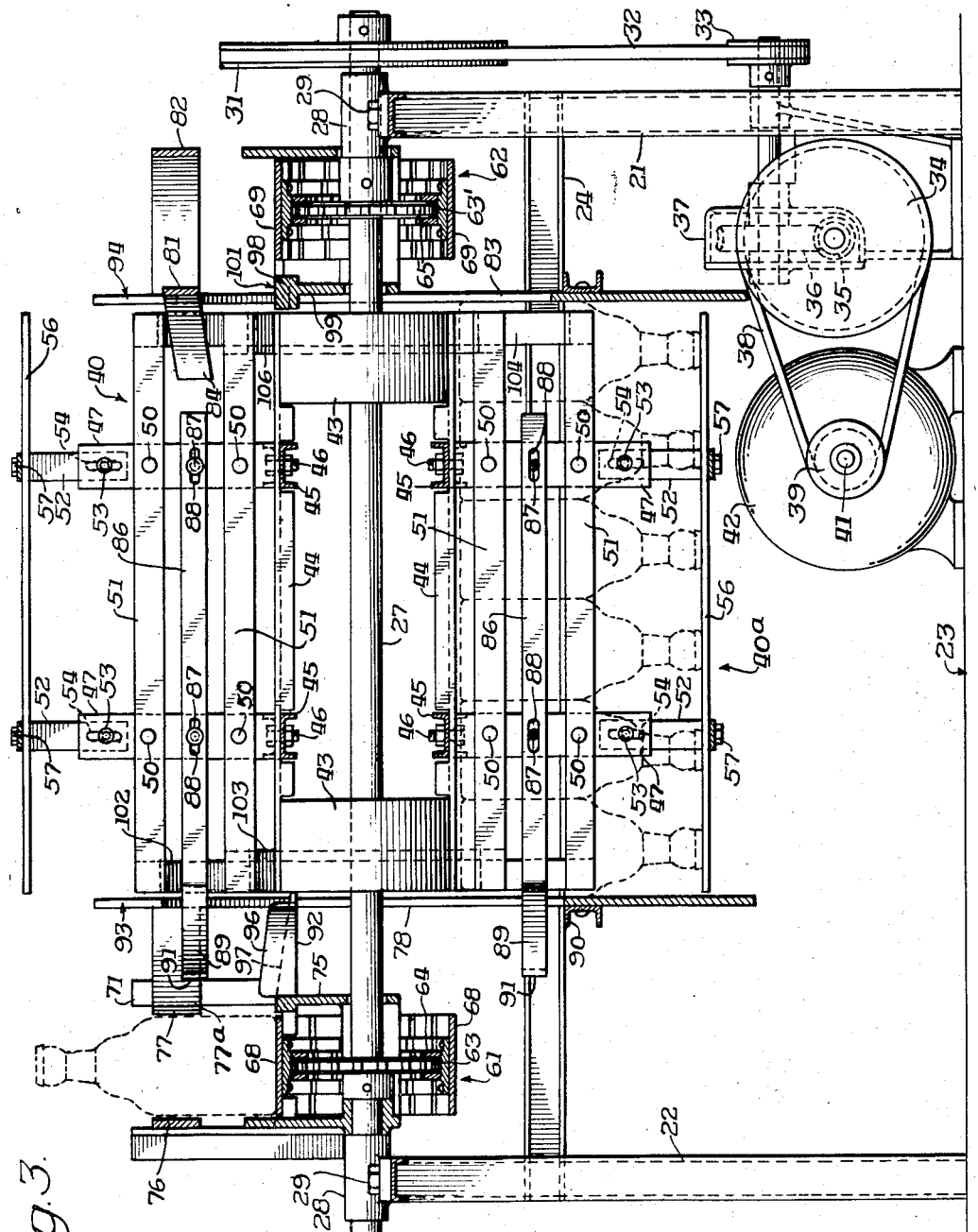
Fig. 3 is an elevational sectional view of the machine taken along the line 3—3 of Fig. 1.

A shaft 27 is journaled at its opposite end portions in bearing members 28 secured to the U-members 21 and 22 by bolts 29. A projecting end of the shaft 27 on the output side of the machine extends somewhat from the bearing 28 as shown in Fig. 1 and secured to it is a large pulley 31 connected by belt 32 to a relatively smaller pulley 33. The latter is driven by pulley 34, being connected through worm 35 and gear 36 which are supported in housing 37. Pulley 34 in turn is driven by belt 38 from pulley 39 mounted on drive shaft 41 of the main motor 42 which is suitably connected (by means not shown) to a source of electrical power.

A pair of collars 43, which in this instance are made of wood, are assembled onto the shaft 27 by means of a press fit thus providing in very simple fashion a torque limiting means to limit the rotational effort that can be applied to the collars by the shaft 27. This part of the structure may be modified in a number of ways all of which, however, will permit the rotation of the container-carriers to stop in the event an object such as one of the bottles becomes jammed between the rotating and non-rotating parts of the mechanism.

A pair of channel members 44 are mounted (as by means of wood screws, not shown) across the collars 43, parallel to the shaft 27, and are diametrically spaced on the collars. Each channel member 44 comprises the floor of one of the bottle carriers which are generally designated 40 and 40a, respectively. Each channel 44 has a pair of shorter channel members 45 transversely mounted on the inner side thereof, each as by means of a bolt 46. Each of the channels 45 has a pair of L-shaped members 47 secured thereto by bolts 48. The L-members 47 each have a short arm provided with an elongated slot 49 for engaging its corresponding bolt 48 and for permitting inward and outward adjustable movement of the L-members to accommodate containers of different widths. Each long arm of the L-members 47 extends substantially radially and carries a pair of bolts 50 for the securement of a pair of guide rails 51 extending longitudinally along each side of each carrier. At the outward end portion of each transverse pair of L-members 47 is an inverted U-shaped member 52 having its parallel arms secured to the L-members as by means of bolts 53. Elongated slots 54 are formed in each arm of the U member 52 to provide for radial adjustable movement to accommodate containers of different heights. An outer plate 56, constituting the ceiling of each carrier, is connected across the bases of U members 52 by means of bolts 57.

Each carrier is preferably of a length sufficient to contain a plurality, in this case six, containers such as bottles, cans and the like in the successive stages of advancement between the inlet and outlet positions designated respectively B and G on the carrier. As the description proceeds, however, it will be apparent that the carriers may be made to retain more or less than six containers depending on the number of rotations required for each container to give the desired mixing action. With a capacity of six containers and with the normally contemplated operation in which one container enters the carrier and one leaves the carrier at each rotation, any individual container will be up-ended six times in passing through the machine. Similarly with a carrier having a capacity of four or eight containers, the normally contemplated operation will result in any individual container being up-ended four or eight times, respectively, in moving through the machine.

From the preceding description of the parts of the carriers, it will be seen that the elements or rails 51, which are circumferentially spaced in pairs on opposite sides of each carrier, provide a guided passage through which the containers can be advanced from the inlet position B toward the outlet position G; furthermore the width of this passageway may be adjustably varied to accommodate bottles, cans or other containers of different widths or diameters. It will also be seen that the "floor" 44 and "ceiling" 56 are radially spaced elements, the spacing between which may be varied to accommodate containers of different heights as well as to provide for movement of the containers radially back and forth between the floor and the ceiling due to gravity as the carriers are turned about the axis of the shaft 27. This radial movement will be desirable in certain cases to enhance the mixing of the contents of the containers. For example, by adjusting the distance between the floor and ceiling to an amount sufficiently greater than the height of the container, the latter will move radially back and forth therebetween on each rotation, and by rotating at proper speed the containers can be caused to strike the floor and the ceiling with a controlled jar tending to dislodge and mix an ingredient which may be concentrated in one end or the other of the container.

An input or feeding conveyor, generally designated 61, is provided for conveying previously filled and capped containers such as bottles $b$ successively to an input station at position A whence they will be transferred onto the carriers in proper sequence by means yet to be described. An output conveyor, generally designated 62, is provided to carry the mixed bottles away from the outlet end of the carrier assembly. In the present instance the conveyors are both arranged to be driven simultaneously with the carrier assembly through driving connections with the sprockets 63 and 63' which are secured to the carrier shaft 27.

The conveyor driving sprockets 63 and 63' are engaged respectively with chains 64 and 65 which in turn are in mesh respectively with idler sprockets 66 and 67. Each link of chain 64 carries a plate 68, these plates functioning to support the incoming, unmixed containers on the top side of the conveyor 61; similarly each link of chain 65 carries a plate 69, these latter plates functioning to support the outgoing, mixed containers on the top side of the conveyor 62.

A pair of angle members 71 are mounted as by welding in spaced upright positions upon the frame crosspiece 24. To each of these members is welded a transverse plate 72 having a rod 73 held therebetween by nuts 74; the idler sprocket 66 is rotatably supported on the rod 73. A housing 75 is provided surrounding the driving sprocket 63 and extends backward along the top of the conveyor. Spaced guide rails 76 and 77 are fastened to the uprights 71 (as by welding) and to an end plate 78 (to be described subsequently) and provide a curved input runway for guiding the containers along the conveyor and to the input station at A.

The output conveyor 62 is constructed similarly to the input conveyor 61 just described and is provided with a pair of guide rails 81 and 82 bolted at one end to a retaining plate 83, the function of which will be described subsequently. The rail 81 is formed with a deflector extension 84 inclined backwardly with respect to the movement of the carriers and positioned to engage a bottle or container in the output position G, when the carrier is moved therepast, and deflect the container outward to position H on the output conveyor. This stationary deflector blade 84 is mounted at such a distance from the shaft 27 that it is intermediate the paths of the upper and lower side rails 51 of the carrier thereby causing no interference with rotation of the latter.

Along the back or trailing side of each carrier, another rail, designated 86, is mounted as by means of bolts 87, this rail being provided with elongated bolt holes 88 to permit longitudinal adjustment. One end of the rail 86 is formed with a forwardly inclined hook or blade 89 terminating in a forwardly extending tip 91. This blade 89 cooperates with the inturned portion 92 of the outer guide 76 to press a container at position A against that inturned portion and then deflect the container onto the inlet position B of the carrier, as the latter is moved past the input station A. As shown in Fig. 8 the deflector 89 is positioned so as to pass between the housing 75 and the conveyor guide rails 76 and 77, the latter being cut away at 77a to provide ample clearance.

The inlet and outlet retaining plates 78 and 83, to which reference has already been made, are provided to prevent the containers on the carrier from accidentally dropping off its ends. The inlet plate 78, bolted onto a crosspiece 90 connecting 24 and 26, is generally annular in form with an inside diameter suitable to clear the diverter blade 89, and having an inlet opening 93 registering with input station A.

The outlet retaining plate 83, mounted on the frame at the outlet end of the carrier assembly, is similar in shape to the inlet plate 78, having an opening 94 in registration with the space between the outlet conveyor guides 81—82 to permit transfer of containers from the carrier to the output conveyor 62.

The openings 93 and 94 in the retaining plates will preferably be staggered, as shown, that is positioned with respect to one another so that, in operation, the last container on the carrier, in position G, will be discharged from the carrier before a new container from position A is transferred onto the same carrier. In the embodiment shown the outlet opening 94 is staggered to a position about 20 degrees earlier than the inlet opening 93; that is, their median lines are inclined respectively at about 10 degrees ahead of and behind a vertical line through shaft 27.

As shown in Fig. 8, a support 96 is suitably secured to the housing 75 (by means not shown) and is provided with an upper surface 97 which is inclined forwardly at approximately 10 degrees so as to tilt a container at approximately the amount of the opening 93 to facilitate its being moved therethrough onto the carrier. Similarly, as shown in Fig. 9, a container support 98 is mounted on the output conveyor housing 99 and has an upper surface 101 inclined backwardly at approximately 10 degrees to accommodate a container discharged from the carrier through the opening 94 at that angle.

As shown, the shaft 27, about which the carrier assembly rotates, is horizontal. Where preferred, however, this shaft may be tilted. For example, it may be tilted downward in the direction of movement of the containers through the carrier passages so the carriers are movable therethrough at least in part by gravity.

In operation, the containers on the input conveyor 61 will be urged forward against one another due to the movement of the conveyor plates 68 beneath them. To prevent the foremost container, at input station A, from being moved through the inlet opening 93 when neither of the carriers is in registration with it, semi-circular straps 102 and 103 are mounted to fill in the otherwise open space between the carriers and are positioned substantially flush with the inlet ends of the carrier side rails 51. Each of the straps 102 is secured, as by welding, between the leading outer rail 51 of one carrier and the trailing outer rail 51 of the other carrier; and straps 103 are similarly secured between the inner rails 51. Thus, normally, when neither carrier is in registration with the inlet plate opening 93, the container in position A will be held away from the carrier assembly by sliding engagement with the straps 102—103. These straps preferably will be formed of flexible material to facilitate movement of the rails 51 in adjusting the space therebetween to accommodate containers of different widths. Similar straps 104 and 106, similarly mounted, are provided at the outlet end portion of the carrier assembly, to prevent any of the mixed and ejected containers falling back through the outlet passage 94 into the space between the carriers.

The operation of the machine may be described as follows:

Assuming the conveyor 61 receives bottles b already filled and capped, the bottles moving along the conveyor toward the input position A will contain a stratum of syrup and above that will be a stratum of carbonated water. These strata will be mixed only slightly at this stage since, in the filling operation, it is desirable to flow the layer of carbonated water onto the syrup as gently as possible to minimize loss of gas in the filling operation. The conveyor will move the containers along between the guide rails 76 and 77 until the forward container is pressed against the rotating straps 102—103 in position A. For the purpose of describing the operation at this point it will be assumed further that each carrier is filled with containers, that is with six containers as shown in Fig. 7. As the carrier assembly rotates past the position shown in Figs. 5 and 6, the bottle at position G will be directed onto the output conveyor 62 by engagement with the stationary director blade 84. As the carrier assembly continues to rotate it will bring the inlet end of one of the carriers into registration with the inlet plate opening 93 and, as shown in Figs. 4 and 7, the diverter blade 89 mounted on the carrier will be effective to transfer a bottle from position A to position B. This transfer will be effective also in causing each bottle already on the carrier to press against its immediately preceding bottle thereby advancing each bottle one step farther toward the outlet position G. As the carrier assembly continues to rotate one bottle will be discharged from and one bottle will be directed onto each carrier at each revolution so that in passing through the machine each individual bottle will be carried through six complete revolutions. Furthermore, where a substantial clearance with respect to the bottle exists between the floor and ceiling of the carrier, each bottle will be jarred on each end six times in passing through the machine thereby further enhancing the mixing operation.

I have found that in the case of bottled root beer and soft drinks of this nature that six revolutions in the machine are sufficient to give perfect mixing of the ingredients. I have thus described one embodiment of my invention together with my improved method of mixing of liquids and the like in bottles and other containers and it is believed that the manner of constructing, applying, operating and using the machine can be fully understood. However, the machine as shown and the principles disclosed are capable of wide variation and application, the specific terms herein being used in a descriptive rather than a limiting sense, the scope of the invention being defined by the claims. For example while I have described two carriers 40 and 40a I believe it is obvious that one carrier alone may be employed if desired or, for quantity production, four carriers or even more may be employed to increase the output of the machine.

I claim:

1. In a machine for mixing the contents of containers such as bottles and the like; a carrier having inlet and outlet portions movable in a circular path about an axis and formed to support a plurality of containers in successive stages of advancement from the inlet to the outlet; driving means for moving said carrier in said circular path; a pair of stationary retaining plates spaced along said axis and mounted at opposite ends of the carrier substantially normal to the axis and effective to retain containers in the inlet and outlet positions of the carrier, the plate on the inlet side being provided with an inlet opening registering with the inlet of the carrier at one rotative position of the latter and the plate on the outlet side being provided with an outlet opening registering with the outlet end of the carrier at a preceding rotative position of the latter; an input station adapted to support a container adjacent the outside of the opening in the input plate and having associated therewith at least one vertical guide member; ejecting means comprising a deflector element associated with the opening in the outlet plate and inclined backward with respect to the movement of the carrier and positioned to intersect a container at the outlet end of the carrier when it is moved past the opening in the outlet plate and deflect the container through the outlet opening; feeding means effective to transfer a container from said input station to the carrier comprising a deflector element movable with the carrier, inclined forwardly with respect to the movement of the carrier, and positioned to engage the container supported at said station to press the container at said station against said guide member and thereby to deflect said container through said opening onto the carrier when the latter is moved past the opening in the inlet plate; said feeding means and said ejector means being staggered with respect to one another about the said path whereby a container is ejected from the carrier outlet before another container is transferred to the carrier inlet.

2. In a machine for mixing the contents of containers such as bottles and the like: a carrier having inlet and outlet portions movable in a circular path about an axis and formed to support a plurality of containers in successive stages of advancement from the inlet to the outlet; driving means for moving said carrier in said circular path; a pair of stationary retaining plates mounted at opposite ends of the carrier substantially normal to said axis and effective to retain containers in the inlet and outlet positions of the carrier, the plate on the inlet side being provided with an inlet opening registering with the inlet of the carrier at one rotative position of the latter and the plate on the outlet side being provided with an outlet opening registering with the outlet end of the carrier at one rotative position of the latter; an input station adapted to support a container adjacent the outside of the input opening; ejecting means comprising a deflector element associated with the outlet opening, inclined backward with respect to the movement of the carrier, and positioned to engage a container at the outlet end of the carrier when it is moved past the outlet opening; feeding means effective to transfer a container from said input station to the carrier comprising a deflector element movable with the carrier, inclined forwardly with respect to the movement of the carrier, and positioned to engage the container supported at said station to deflect said container through said inlet opening onto the carrier when the latter is moved past said inlet opening.

3. In a machine for mixing the contents of containers such as bottles and the like; a carrier movable about an axis and formed to define a longitudinal passage parallel to said axis adapted to contain a plurality of linearly aligned containers movable in successive stages therethrough between the inlet and outlet end portions thereof; driving means for moving said carrier, a pair of stationary retaining plates mounted at opposite ends of the carrier substantially normal to said axis and effective to retain containers in the inlet and outlet positions of the carrier, the plate on the inlet side being provided with an inlet opening registering with the inlet of the carrier at one rotative position of the latter and the plate on the outlet side being provided with an outlet opening registering with the outlet end of the carrier at one rotative position of the latter; an input station adapted to support a container adjacent the outside of the opening in the input plate, said input station having a floor portion suitably inclined to support a container at substantially the angle of the median line of the inlet opening; ejecting means comprising a deflector element associated with the outlet plate opening and inclined backward with respect to the movement of the carrier and positioned to intersect a container at the outlet end portion of the carrier when it is moved past the opening in the outlet plate; feeding means effective to transfer a container from said input station to the carrier comprising a deflector element movable with the carrier, said feeding means being inclined forwardly with respect to the movement of the carrier and positioned to engage a container supported at said station to deflect said container through said opening onto the carrier when the latter is moved past the opening in the inlet plate; and members rotatable with said carrier and mounted respectively adjacent the inlet and outlet ends of the carrier for preventing movement of a container through either of said inlet and outlet plate openings onto the carrier when the carrier is out of registration with said plate openings.

4. A machine for mixing the contents of beverage bottles after the filling and capping thereof comprising a rotary structure, a plurality of bottle carriers on the outer periphery of said structure extending longitudinally thereof and each open at opposite ends for receiving bottles at one end and discharging bottles at the other end during rotation of the successive carriers into bottle receiving and bottle discharge positions, said carriers each being dimensioned to hold a plurality of bottles in side by side relation and to enable all the bottles in each carrier to be shifted toward the discharge end thereof a distance corresponding to a bottle diameter upon the enforced entry of a bottle into the receiving end of the carrier, a receiving conveyor extending along the bottle discharge end of the rotary structure for receiving bottles discharged consecutively from the carriers as the carriers move in succession to said discharge position, a bottle delivery carrier disposed adjacent the other end of the rotary structure for delivering bottles in succession into registration with the receiving ends of the carriers as the latter move into said bottle receiving position, and means comprising a curved guide rail along said delivery conveyor for forcing successive bottles laterally from said conveyor into the receiving ends of the carriers as the latter move in succession into said receiving position during rotation of said structure.

5. A machine for mixing the contents of beverage bottles after the filling and capping thereof comprising a bottle carrying structure rotatable about a horizontal axis, said structure being provided with a plurality of bottle carriers having open receiving and open discharge ends, said carriers extending longitudinally of the outer periphery of the structure and being dimensioned for holding bottles in side-by-side contacting relation whereby the enforced entry of a bottle into a carrier at the receiving end thereof shifts all the bottles within the respective carrier a distance corresponding to a bottle diameter, an endless receiving conveyor having an upper run disposed in a plane for receiving bottles shifted outwardly of the discharge ends of the successive carriers as the latter move successively through the upper portion of the rotative path of the carriers, an endless bottle delivery conveyor having a run disposed at an elevation for delivering bottles successively along the receiving ends of the carriers as the same are moved through the upper portion of the rotative path of the carriers, and means for forcing bottles in succession laterally from the delivery conveyor into the receiving ends of succeeding carriers as the latter move through the upper portion of the rotative path of the carriers.

6. In a machine for mixing the contents of capped beverage bottles comprising a carrier mounted for rotation about a horizontal axis and provided with a plurality of open-ended bottle-holding chambers extending longitudinally of the carrier and each adapted to hold a plurality of bottles in side by side relation during operation of the carrier, said chambers each providing a continuous passage through which bottles are adapted to be advanced with a step by step action from an intake end portion to an outlet end portion of the chambers, a bottle feeding conveyor arranged for delivering bottles successively to an intake station in alignment with the intake ends of the chambers when the latter move successively into a given bottle receiving position, bottle-engaging members one secured to the carrier adjacent the intake end of each chamber for engaging bottles successively in said station and moving the bottles into the respective chambers during operation of the carrier and forcing each said bottle against the last inserted bottles in the chambers for advancing the same and all the other bottles therein one step toward the outlet end of the respective chambers, and a stationary bottle deflector member extending into the path of rotation of the outlet end portions of said chambers for engaging bottles at said end portions for removing the said bottles from the chambers successively, said deflector member being located rotatively in advance of said bottle intake position of the chambers for effecting the said removal of the bottles from the chambers to provide spaces at the outlet end portions of the respective chambers for accommodating the said advancing movement of the remaining bottles within the respective chambers.

7. In a machine for mixing the contents of beverage bottles, a carrier movable cyclically about a horizontal axis, members on the carrier providing a plurality of longitudinally extending open-ended bottle holding chambers each adapted to hold a plurality of bottles in contacting side by side relation, means providing a bottle intake station adjacent one end of the carrier at an elevation for registration with said chambers successively during rotation of the latter, a conveyor for delivering bottles in succession to said intake station, means for feeding bottles successively from said station into the adjacent open ends of each chambers successively as the same move into registration with said station and causing each said entering bottle to shift all the other bottles in the respective chambers one step toward the other end of the chambers, and a member adjacent said other end of the carrier for effecting the ejectment of a bottle from each chamber in succession at a position rotatively in advance of said intake station for providing in each of said chambers a space that accommodates said shifting movement of remaining bottles in the chambers by said entering bottles.

STANLEY A. DOMACK.

REFERENCES CITED

The following references are of record in the file of this patent:

UNITED STATES PATENTS

| Number | Name | Date |
|---|---|---|
| 1,355,032 | Brown | Oct. 5, 1920 |
| 1,991,862 | Moberg | Feb. 19, 1935 |
| 2,043,621 | Judd | June 6, 1936 |
| 2,103,158 | Kantor | Dec. 21, 1937 |
| 2,265,803 | Davis | Dec. 9, 1941 |
| 2,277,310 | Englehart | Mar. 24, 1942 |
| 2,320,730 | Hite et al. | June 1, 1943 |

Certificate of Correction

Patent No. 2,563,319                        August 7, 1951

STANLEY A. DOMACK

It is hereby certified that error appears in the printed specification of the above numbered patent requiring correction as follows:

Column 7, lines 63 and 64, for "positions" read *portions*;

and that the said Letters Patent should be read as corrected above, so that the same may conform to the record of the case in the Patent Office.

Signed and sealed this 13th day of November, A. D. 1951.

[SEAL]

THOMAS F. MURPHY,
*Assistant Commissioner of Patents.*